United States Patent [19]
Scarborough

[11] Patent Number: 6,053,160
[45] Date of Patent: Apr. 25, 2000

[54] BARBECUE GRILL DEBRIS CATCHING TROUGH

[76] Inventor: Truman Scarborough, 4205A North Liberty, Hill A.F.B., Utah 84056

[21] Appl. No.: 09/282,937

[22] Filed: Apr. 1, 1999

[51] Int. Cl.$^7$ .................................................. A47J 37/04
[52] U.S. Cl. ..................... 126/25 R; 126/41 R; 126/51; 99/444
[58] Field of Search ................... 126/41 R, 25 R, 126/9 R, 9 B, 25 C, 51, 37 B, 41 D; 99/444, 445, 446

[56] References Cited

U.S. PATENT DOCUMENTS

| | | | |
|---|---|---|---|
| 3,230,863 | 1/1966 | Carson | 126/25 R |
| 4,936,202 | 6/1990 | Lin | 99/444 |
| 5,325,843 | 7/1994 | Bravata, Jr. | 126/51 |

*Primary Examiner*—James C. Yeung

[57] ABSTRACT

A barbecue grill debris catching trough for mounting to a back of a barbecue grill to catch debris falling from the grill between the gap formed between the lower portion of the barbecue grill and the hood portion of the barbecue grill. The barbecue grill debris catching trough includes an elongate trough having a bottom wall, a spaced apart pair of end walls, and a spaced apart pair of side walls extending between the end walls. A hanging clip with an outwardly facing resilient clip portion upwardly extends from one of the side walls.

8 Claims, 2 Drawing Sheets

BARBECUE GRILL DEBRIS CATCHING TROUGH

BACKGROUND OF THE INVENTION

1. Field of the Invention

The present invention relates to barbecue grill accessories and more particularly pertains to a new barbecue grill debris catching trough for mounting to a back of a barbecue grill to catch debris falling from the grill between the gap formed between the lower portion of the barbecue grill and the hood portion of the barbecue grill.

2. Description of the Prior Art

The use of barbecue grill accessories is known in the prior art. More specifically, barbecue grill accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,296,957; U.S. Pat. No. 4,574,770; U.S. Pat. No. 4,936,202; U.S. Pat. No. Des. 255,479; U.S. Pat. No. 3,285,239; and U.S. Pat. No. 4,352,324.

While these devices fulfill their respective, particular objectives and requirements, the aforementioned patents do not disclose a new barbecue grill debris catching trough. The inventive device includes an elongate trough having a bottom wall, a spaced apart pair of end walls, and a spaced apart pair of side walls extending between the end walls. A hanging clip with an outwardly facing resilient clip portion upwardly extends from one of the side walls.

In these respects, the barbecue grill debris catching trough according to the present invention substantially departs from the conventional concepts and designs of the prior art, and in so doing provides an apparatus primarily developed for the purpose of mounting to a back of a barbecue grill to catch debris falling from the grill between the gap formed between the lower portion of the barbecue grill and the hood portion of the barbecue grill.

SUMMARY OF THE INVENTION

In view of the foregoing disadvantages inherent in the known types of barbecue grill accessories now present in the prior art, the present invention provides a new barbecue grill debris catching trough construction wherein the same can be utilized for mounting to a back of a barbecue grill to catch debris falling from the grill between the gap formed between the lower portion of the barbecue grill and the hood portion of the barbecue grill.

The general purpose of the present invention, which will be described subsequently in greater detail, is to provide a new barbecue grill debris catching trough apparatus and method which has many of the advantages of the barbecue grill accessories mentioned heretofore and many novel features that result in a new barbecue grill debris catching trough which is not anticipated, rendered obvious, suggested, or even implied by any of the prior art barbecue grill accessories, either alone or in any combination thereof.

To attain this, the present invention generally comprises an elongate trough having a bottom wall, a spaced apart pair of end walls, and a spaced apart pair of side walls extending between the end walls. A hanging clip with an outwardly facing resilient clip portion upwardly extends from one of the side walls.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new barbecue grill debris catching trough apparatus and method which has many of the advantages of the barbecue grill accessories mentioned heretofore and many novel features that result in a new barbecue grill debris catching trough which is not anticipated, rendered obvious, suggested, or even implied by any of the prior art barbecue grill accessories, either alone or in any combination thereof.

It is another object of the present invention to provide a new barbecue grill debris catching trough which may be easily and efficiently manufactured and marketed.

It is a further object of the present invention to provide a new barbecue grill debris catching trough which is of a durable and reliable construction.

An even further object of the present invention is to provide a new barbecue grill debris catching trough which is susceptible of a low cost of manufacture with regard to both materials and labor, and which accordingly is then susceptible of low prices of sale to the consuming public, thereby making such barbecue grill debris catching trough economically available to the buying public.

Still yet another object of the present invention is to provide a new barbecue grill debris catching trough which provides in the apparatuses and methods of the prior art some of the advantages thereof, while simultaneously overcoming some of the disadvantages normally associated therewith.

Still another object of the present invention is to provide a new barbecue grill debris catching trough for mounting to a back of a barbecue grill to catch debris falling from the grill between the gap formed between the lower portion of the barbecue grill and the hood portion of the barbecue grill.

Yet another object of the present invention is to provide a new barbecue grill debris catching trough which includes an elongate trough having a bottom wall, a spaced apart pair of end walls, and a spaced apart pair of side walls extending between the end walls. A hanging clip with an outwardly facing resilient clip portion upwardly extends from one of the side walls.

Still yet another object of the present invention is to provide a new barbecue grill debris catching trough that catches food that falls behind a barbecue grill (such as a gas grill) before the food reaches the ground so that the fallen food may be easily collected for disposal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
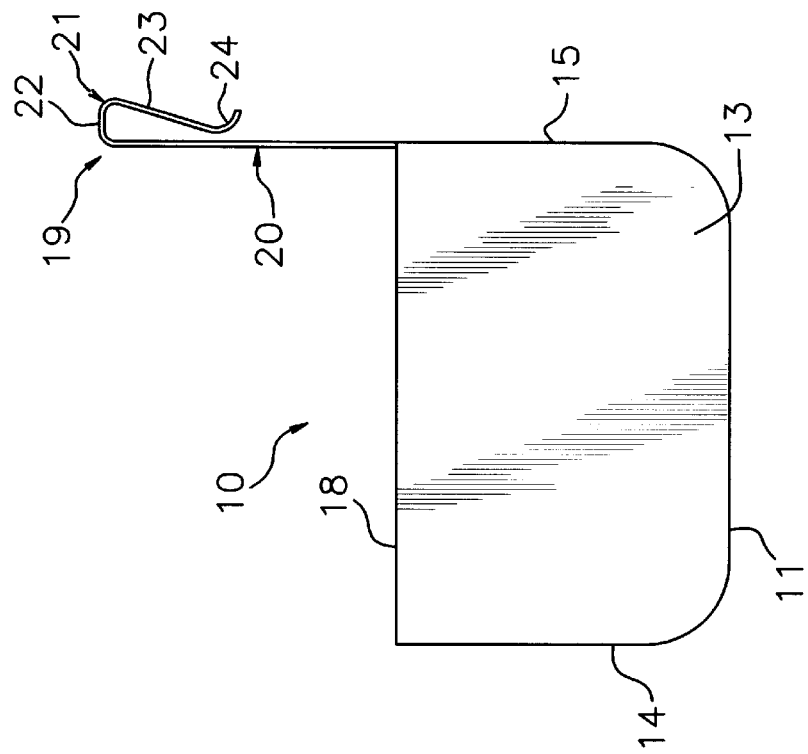
FIG. 2 is a schematic end view of the present invention.
Figure 1:
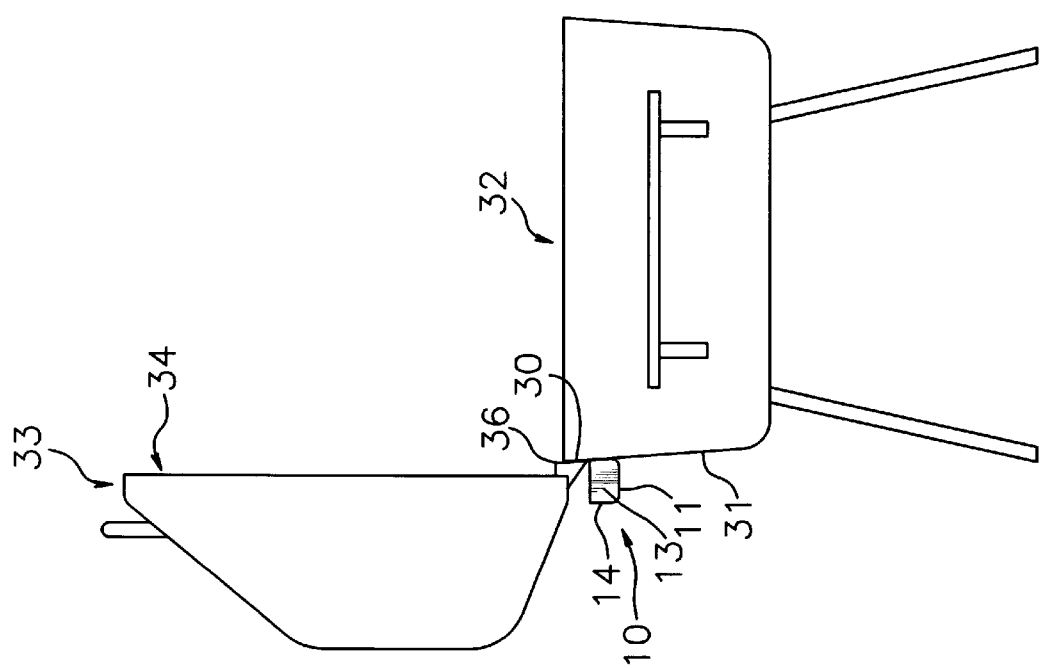
FIG. 1 is a schematic side view of a new barbecue grill debris catching trough in use hung on a back of a barbecue grill according to the present invention.
Figure 3:
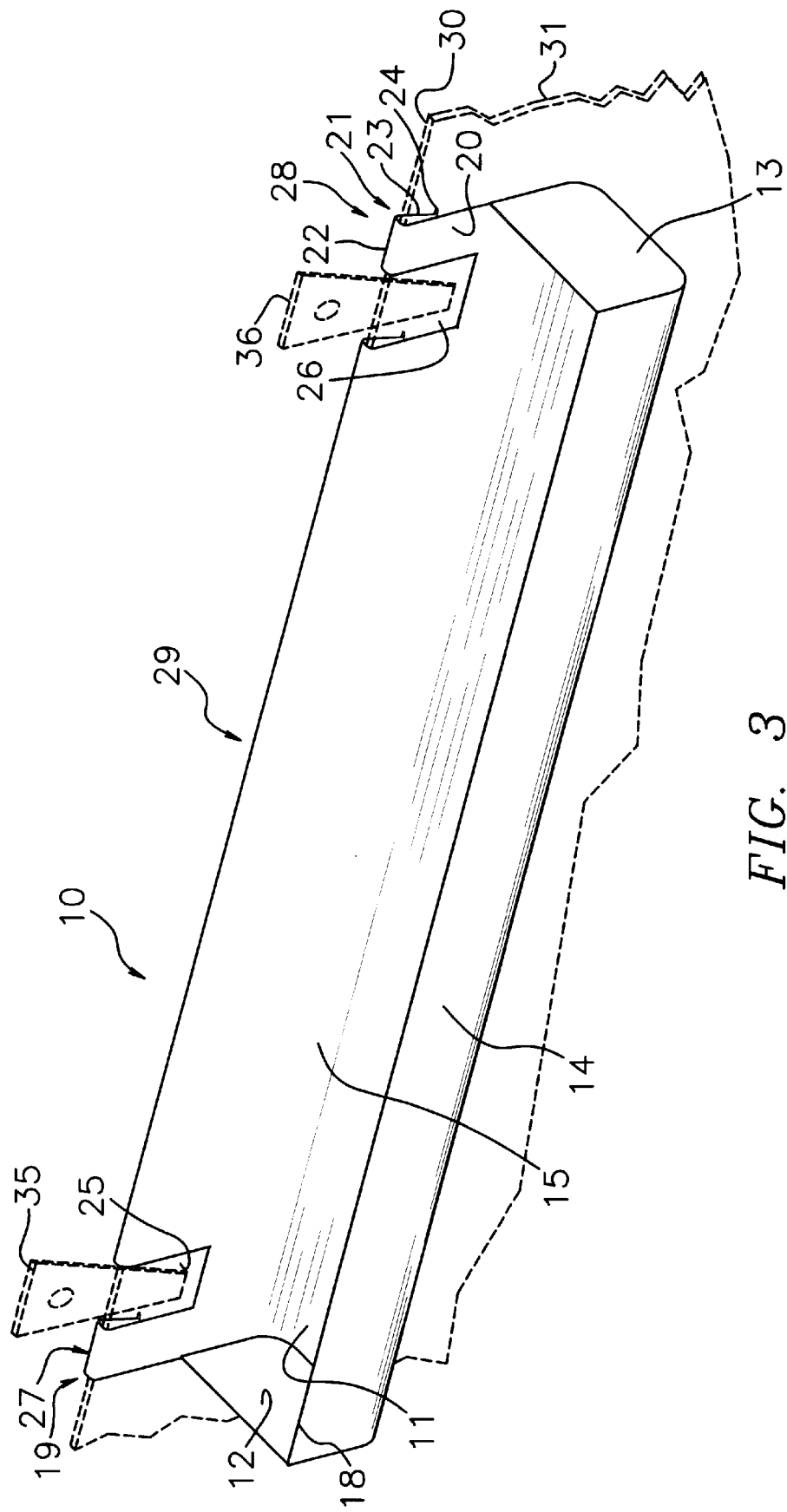
FIG. 3 is a schematic perspective view of the present invention.

With reference now to the drawings, and in particular to FIGS. 1 through 3 thereof, a new barbecue grill debris catching trough embodying the principles and concepts of the present invention and generally designated by the reference numeral 10 will be described.

As best illustrated in FIGS. 1 through 3, the barbecue grill debris catching trough generally comprises an elongate trough having a bottom wall, a spaced apart pair of end walls, and a spaced apart pair of side walls extending between the end walls. A hanging clip with an outwardly facing resilient clip portion upwardly extends from one of the side walls.

In closer detail the barbecue grill debris catching trough comprises an elongate trough 10 having a bottom wall 11, and a perimeter wall upwardly extending around the bottom wall comprising a spaced apart pair of end walls 12,13, and a spaced apart pair of side walls 14,15 extending between the end walls. The end walls are preferably extended substantially parallel to one another and the side walls are preferably extended substantially parallel to one another and substantially perpendicular to the end walls. In this preferred embodiment, the end and side walls are also preferably extended substantially perpendicular to the bottom wall. Ideally, the side walls each have a rounded lower edge 16,17 connecting the respective side wall to the bottom wall. The end walls and a first of the side walls each have coextensive upper edges 18. The upper edges of the end walls and the first side wall substantially lying in a common plane with one another substantially parallel to the bottom wall.

The trough has a length defined between the end walls, a width defined between the side walls, and a depth defined between the bottom wall and the common plane of the upper edges. The length of the trough is greater than the depth of the trough, and the depth of the trough is greater than the width of the trough Preferably, the length of the trough is at least about four times the width of the trough and the length of the trough is at least about five time the width of the trough. In an ideal illustrative embodiment, the length of the trough is about 24 inches, the depth of the trough is about 3 inches, and the width of the trough is about 2 inches.

A hanging clip 19 upwardly extends from a second of the side walls above the common plane of the upper edges of the end walls and the first side wall. The hanging tab has a back portion 20 preferably substantially lying in a common plane with the first side wall. The hanging tab also preferably extends substantially across the second side wall between the end walls.

The hanging tab has an outwardly facing resilient clip portion 21 which has a generally inverted U-shaped upper portion 22 connected to the back portion of the hanging tab, an elongate middle portion 23 downwardly extending from the upper portion of the clip and towards the back portion of the hanging tab, and an end portion 24 downwardly extending from the middle portion of the clip and outwardly extending from the back portion of the hanging tab.

The hanging tab preferably has a spaced apart pair of cutouts 25,26 extending through the back portion and the clip portion of the hanging tab. One of the cutouts is positioned towards and spaced apart from one of the end walls and the other of the cutouts is positioned towards and spaced apart from the other of the end walls. The cutouts dividing the hanging tab and hanging clip into three segments comprising a pair of end segments 27,28 and a middle segment 29 interposed between the cutouts.

In use, the hanging tab is designed for hanging on an upper edge 30 of a back wall 31 of a lower portion 32 of a barbecue grill 33 so that the back wall of the lower portion of the barbecue grill is positioned between the back portion of the hanging tab and the middle and end portions of the clip portion of the hanging tab with the second side wall abutting the back wall of the lower portion of the barbecue grill and positioned beneath the upper edge of the back wall of the lower portion of the barbecue grill. This arrangement lets the trough catch debris (such as food) falling from a space formed between the upper edge of the back wall of the lower portion of the barbecue grill and a lower edge of a back of a hood portion 34 of the barbecue grill pivotally coupled to the back wall of the lower portion of the barbecue grill. As illustrated in FIG. 3, the cutouts each are designed for receiving therein a hinge 35,36 of the barbecue grill outwardly extending from the lower portion of the barbecue grill to pivotally connect the lower portion of the barbecue grill to the back of the hood portion of the barbecue grill.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A barbecue grill debris catcher, comprising:

an elongate trough having a bottom wall, a spaced apart pair of end walls, and a spaced apart pair of side walls extending between said end walls;

a hanging tab upwardly extending from a one of said side walls; and said hanging tab having an outwardly facing resilient clip portion;

wherein said hanging tab has a spaced apart pair of cutouts extending through said back portion and said clip portion of said hanging tab, one of said cutouts being positioned towards and spaced apart from one of said end walls and the other of said cutouts being positioned towards and spaced apart from the other of said end walls.

2. The barbecue grill debris catcher of claim 1, wherein said end walls are extended substantially parallel to one another, said side walls being extended substantially parallel to one another and substantially perpendicular to said end walls, said end and side walls being extended substantially perpendicular to said bottom wall.

3. The barbecue grill debris catcher of claim 2, wherein said side walls each have a rounded lower edge connecting the respective side wall to said bottom wall.

4. The barbecue grill debris catcher of claim 3, wherein said hanging tab extends substantially across said second side wall between said end walls.

5. A barbecue grill debris catching system, comprising:

an elongate trough having a bottom wall, a spaced apart pair of end walls, and a spaced apart pair of side walls extending between said end walls;

said end walls being extended substantially parallel to one another, said side walls being extended substantially parallel to one another and substantially perpendicular to said end walls, said end and side walls being extended substantially perpendicular to said bottom wall;

said side walls each having a rounded lower edge connecting the respective side wall to said bottom wall;

said end walls and a first of said side walls each having an upper edge, said upper edges of said end walls and said first side wall substantially lying in a common plane with one another substantially parallel to said bottom wall;

said trough having a length defined between said end walls, a width defined between said side walls, and a depth defined between said bottom wall and said common plane of said upper edges;

wherein said length of said trough is greater than said depth of said trough, and said depth of said trough is greater than said width of said trough a hanging tab upwardly extending from a second of said side walls above said common plane of said upper edges of said end walls and said first side wall, said hanging tab having a back portion substantially lying in a common plane with said first side wall;

said hanging tab extending substantially across said second side wall between said end walls;

said hanging tab having an outwardly facing resilient clip portion, said clip portion of said hanging tab having a generally inverted U-shaped upper portion connected to said back portion of said hanging tab, an elongate middle portion downwardly extending from said upper portion of said clip and towards said back portion of said hanging tab and an end portion downwardly extending from said middle portion of said clip and outwardly extending from said back portion of said hanging tab;

said hanging tab having a spaced apart pair of cutouts extending through said back portion and said clip portion of said hanging tab, one of said cutouts being positioned towards and spaced apart from one of said end walls and the other of said cutouts being positioned towards and spaced apart from the other of said end walls, said cutouts dividing said hanging tab and hanging clip into three segments comprising a pair of end segments and a middle segment interposed between said cutouts; and said hanging tab being adapted for hanging on a upper edge of a back wall of a lower portion of a barbecue grill so that said back wall of said lower portion of said barbecue grill is positioned between said back portion of said hanging tab and said middle and end portions of said clip portion of said hanging tab and said second side wall abuts said back wall of said lower portion of said barbecue grill and is positioned beneath said upper edge of said back wall of said lower portion of said barbecue grill to catch debris falling from a space formed between said upper edge of said back wall of said lower portion of said barbecue grill and a lower edge of a back of a hood portion of said barbecue grill pivotally coupled to said back wall of said lower portion of said barbecue grill, said cutouts each being adapted for receiving therein a hinge of said barbecue grill outwardly extending from said lower portion of said barbecue grill to pivotally connect said lower portion of said barbecue grill to said back of said hood portion of said barbecue grill.

6. A barbecue grill debris catcher comprising:

an elongate trough having a bottom wall a spaced apart pair of end walls, and a spaced apart pair of side walls extending between said end walls;

a hanging tab upwardly extending from a one of said side walls; and said hanging tab having an outwardly facing resilient clip portion;

wherein said hanging tab extends substantially across said second side wall between said end walls;

wherein said hanging tab has a spaced apart pair of cutouts extending through said back portion and said clip portion of said hanging tab, one of said cutouts being positioned towards and spaced apart from one of said end walls and the other of said cutouts being positioned towards and spaced apart from the other of said end walls.

7. The barbecue grill debris catcher of claim 5, wherein said end walls are extended substantially parallel to one another, said side walls being extended substantially parallel to one another and substantially perpendicular to said end walls, said end and side walls being extended substantially perpendicular to said bottom wall.

8. The barbecue grill debris catcher of claim 7, wherein said side walls each have a rounded lower edge connecting the respective side wall to said bottom wall.

* * * * *